(12) United States Patent
Choi et al.

(10) Patent No.: US 8,170,064 B2
(45) Date of Patent: May 1, 2012

(54) METHOD AND APPARATUS FOR ORTHOGONAL FREQUENCY DIVISION MULTIPLEXING COMMUNICATION

(75) Inventors: Pil-soon Choi, Anyang-si (KR); Ji-sung Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 662 days.

(21) Appl. No.: 11/739,803

(22) Filed: Apr. 25, 2007

(65) Prior Publication Data

US 2008/0112310 A1 May 15, 2008

(30) Foreign Application Priority Data

Nov. 10, 2006 (KR) .................. 10-2006-0111232

(51) Int. Cl.
*H04J 1/00* (2006.01)
(52) U.S. Cl. ...................................... 370/482
(58) Field of Classification Search .......... 370/208–210, 370/207, 203, 204, 206, 310, 343–344, 431, 370/464, 476, 480–482, 485; 375/260, 267, 375/215, 294, 373, 376, 259, 271, 295, 299–302, 375/316, 320–322, 324, 326–327, 346–347, 375/354, 371
See application file for complete search history.

(56) References Cited

U.S. PATENT DOCUMENTS

| | | | |
|---|---|---|---|
| 3,743,775 A * | 7/1973 | Hutchinson et al. ........... 375/328 |
| 6,930,631 B2 * | 8/2005 | Puglia .............................. 342/70 |
| 6,952,454 B1 * | 10/2005 | Jalali et al. .................... 375/260 |
| 7,515,089 B2 * | 4/2009 | Szajnowski ..................... 342/27 |
| 7,567,788 B2 * | 7/2009 | Newton et al. ............. 455/237.1 |
| 2003/0016622 A1 * | 1/2003 | McCarty, Jr. .................. 370/207 |
| 2004/0047324 A1 * | 3/2004 | Diener .......................... 370/338 |
| 2005/0053164 A1 | 3/2005 | Catreux et al. |
| 2005/0245199 A1 | 11/2005 | Batra et al. |
| 2006/0023666 A1 | 2/2006 | Jalali et al. |
| 2006/0211426 A1 * | 9/2006 | Costa et al. .................... 455/450 |
| 2006/0229029 A1 * | 10/2006 | Waltho et al. ................... 455/73 |
| 2007/0223608 A1 * | 9/2007 | Nakayama et al. ............ 375/260 |
| 2008/0095214 A1 * | 4/2008 | Smith et al. .................... 375/131 |
| 2008/0130715 A1 * | 6/2008 | Gorday et al. ................. 375/146 |
| 2008/0310461 A1 * | 12/2008 | Bader et al. .................... 370/537 |
| 2009/0135713 A1 * | 5/2009 | Hwang et al. ................. 370/210 |
| 2010/0020757 A1 * | 1/2010 | Walton et al. ................. 370/329 |

FOREIGN PATENT DOCUMENTS

| CN | 1448015 A | 10/2003 |
|---|---|---|
| CN | 1820441 A | 8/2006 |

OTHER PUBLICATIONS

Rajbanshi, et al., "An Efficient Implementation of NC-OFDM Transceivers for Cognitive Radios", Information and Telecommunication Technology Center, The University of Kansas, Lawrence, KS.

(Continued)

*Primary Examiner* — Derrick Ferris
*Assistant Examiner* — Omar Ghowrwal
(74) *Attorney, Agent, or Firm* — Sughrue Mion, PLLC

(57) ABSTRACT

A method and apparatus for transmitting and receiving a digital signal using an orthogonal frequency division multiplexing (OFDM) communication system are provided. In this method, subcarriers are split into a plurality of subcarrier groups according to available frequency bandwidths and are respectively transmitted in a transmitting portion and the subcarrier groups are combined and are restored to the original signal in a receiving portion. Therefore, wireless resources may be used efficiently by combining with cognitive radio technology.

21 Claims, 8 Drawing Sheets

OTHER PUBLICATIONS

Communication (Office Action dated Jan. 13, 2011) from the State Intellectual Property Office of P.R. China in a counterpart application No. 200710146501.0.

Communication issued on Oct. 10, 2011 by the State Intellectual Property Office of the P.R. Of China in the counterpart Chinese Patent Application No. 200710146501.0.

* cited by examiner

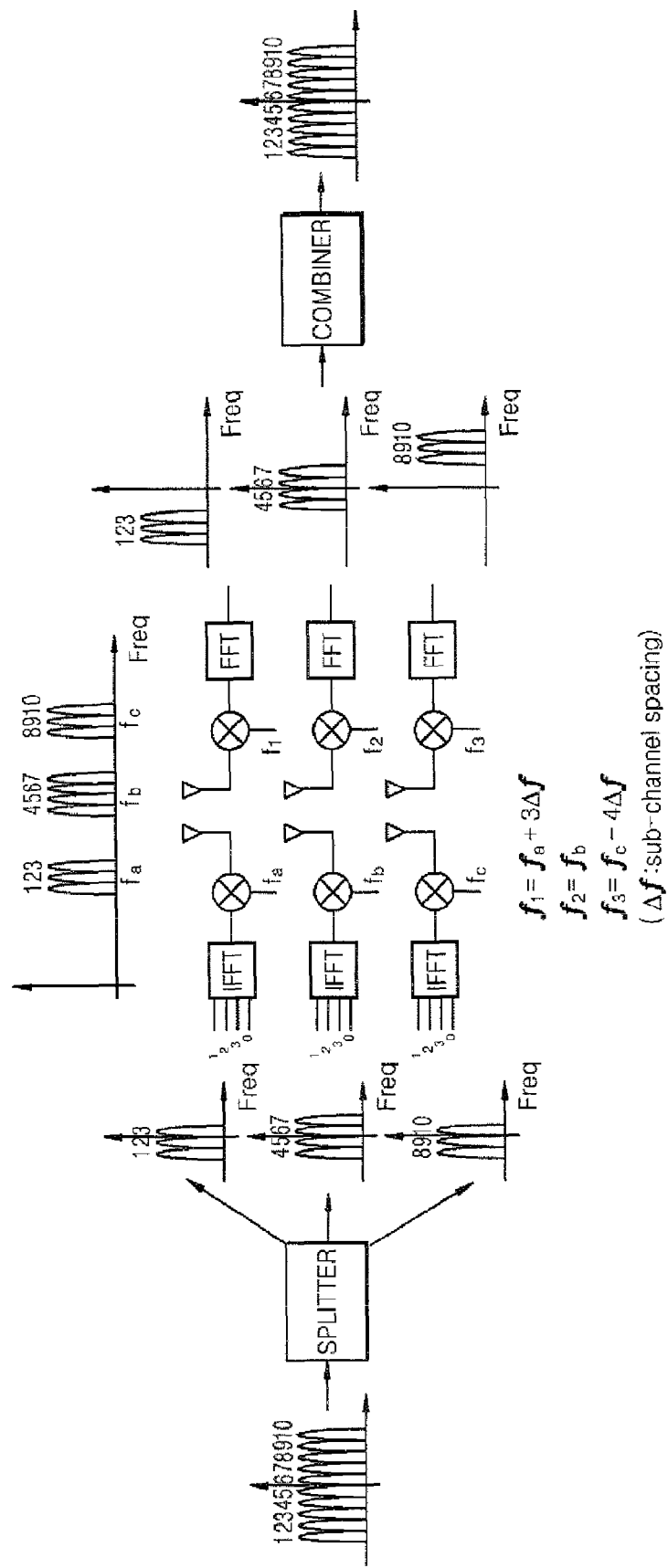

METHOD AND APPARATUS FOR ORTHOGONAL FREQUENCY DIVISION MULTIPLEXING COMMUNICATION

CROSS-REFERENCE TO RELATED PATENT APPLICATIONS

This application claims priority from Korean Patent Application No. 10-2006-0111232, filed on Nov. 10, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to wireless communication, and more particularly, to transmitting and receiving a digital signal using an orthogonal frequency division multiplexing (OFDM) communication system.

2. Description of the Related Art

Recently, active research has been carried out on cognitive radio technology and the use of frequency resources for efficient wireless communication. FIGS. 1A and 1B are diagrams for describing cognitive radio technology. Referring to FIG. 1A, generally, frequency resources available for wireless communication are allocated in a manner so as not to overlap with a variety of wireless communication standards. Therefore, communication with a device, which communicates according to a certain standard, may not be possible if all the channels allocated to the corresponding standard are being used, although channels allocated to other communication standards are not being used.

Cognitive radio technology searches available wireless channels according to regions and time in order to use available channels. As illustrated in FIG. 1B, the available channels can be searched for and used regardless of time and frequency bands.

FIGS. 2A through 2C are diagrams for describing OFDM communication.

FIG. 2A is a block diagram of an OFDM transmitting apparatus. Referring to FIG. 2A, when a digital signal is input, a serial-to-parallel (S/P) converter 21 splits the digital signal into a plurality of signals so as to input the signals to an inverse fast Fourier transformation (IFFT) device 22. In FIG. 2A, it is assumed that three-point IFFT is used. The IFFT device 22 performs IFFT on the input signals. When the IFFT is completed, digital signals corresponding to a plurality of subcarriers are generated. Since the IFFT and a FFT are well known and are disclosed in a variety of documents, detailed descriptions thereof will be omitted.

A parallel-to-serial (P/S) converter 23 combines the digital signals output from the IFFT device 22 and then converts the signals into a serial signal. A digital-to-analog (D/A) converter 24 converts a digital signal output from the P/S converter 23 into an analog signal. A mixer 25 performs frequency up-conversion using carriers which have radio frequencies (RFs).

FIGS. 2B and 2C are frequency domain graphs illustrating signals output from ① and ② of the OFDM transmitting apparatus illustrated in FIG. 2A. As illustrated in FIG. 2B, the subcarriers at baseband generated by the IFFT are modulated into RF signals at a frequency band of the carriers by the mixer 25 of FIG. 2A and then the modulated signals are transmitted externally.

In the above described OFDM system, although available frequency resources are searched for using cognitive radio technology, the frequency resources cannot be enabled if an available frequency bandwidth is less than the bandwidth of subcarriers.

SUMMARY OF THE INVENTION

The present invention provides a method and apparatus for using frequency resources efficiently by splitting subcarriers and transmitting the subcarriers, respectively, in an OFDM system.

According to an aspect of the present invention, there is provided a method of transmitting a digital signal, the method including splitting the digital signal at baseband into a plurality of signals according to available frequency bands; performing inverse fast Fourier transformation (IFFT) on each of the split signals to generate subcarriers; and transmitting the subcarriers through the available frequency bands.

The method of transmitting a digital signal may further include searching for the available frequency bands using cognitive radio technology.

The signals split according to the available frequency bands may include a plurality of subcarrier groups, and each of the subcarrier groups may include at least one subcarrier. In this case, the IFFT is performed on each of the subcarrier groups. Further, the transmitting may include low-pass-filtering each of the subcarrier groups corresponding to the split signals; modulating each of the low-pass-filtered subcarrier groups independently using different RF signals; and transmitting the modulated subcarrier groups.

The low-pass-filtering may be performed variably according to a bandwidth of each the subcarrier groups.

The RF signals which have different frequencies from each other may be generated by a signal output from a phase-locked loop (PLL) circuit using at least one of a frequency divider and a frequency multiplier.

According to another aspect of the present invention, there is provided a computer readable recording medium having recorded thereon a computer program for executing the method of transmitting a digital signal.

According to another aspect of the present invention, there is provided an apparatus for transmitting a digital signal, the apparatus including a splitter which splits the digital signal at baseband into a plurality of signals according to available frequency bands; a plurality of IFFT units which performs IFFT on each of the split signals to generate subcarriers; and a transmitter which transmits the subcarriers generated through the available frequency bands.

According to another aspect of the present invention, there is provided a method of receiving a digital signal, the method including receiving subcarrier groups modulated using RF signals which have different frequencies from each other; demodulating each of the subcarrier groups so that all subcarriers of each of the subcarrier groups are arranged adjacent to each other in a predetermined order at baseband; performing fast Fourier transformation (FFT) on each of the demodulated subcarrier groups independently; and combining the subcarrier groups on which the FFT is performed.

The demodulating may include frequency down-converting each of the subcarrier groups independently using the RF signals which have different frequencies from each other; and low-pass-filtering each of the frequency down-converted subcarrier groups variably according to a bandwidths of each of the subcarrier groups.

According to another aspect of the present invention, there is provided a computer readable recording medium having recorded thereon a computer program for executing the method of receiving a digital signal.

According to another aspect of the present invention, there is provided an apparatus for receiving a digital signal, the apparatus including an RF receiver which receives subcarrier groups modulated using RF signals which have different frequencies from each other; a demodulator which demodulates each of the subcarrier groups so that all subcarriers of each of the subcarrier groups are arranged adjacent to each other in a predetermined order at baseband; a plurality of FFT units which performs FFT on each of the demodulated subcarrier groups independently; and a combiner which combines the subcarrier groups on which the FFT is performed.

BRIEF DESCRIPTION OF THE DRAWINGS

The above and other aspects of the present invention will become more apparent by describing in detail exemplary embodiments thereof with reference to the attached drawings, in which:

FIG. 8 is a diagram of a method of transmitting and receiving digital signals according to an exemplary embodiment of the present invention.

DETAILED DESCRIPTION OF EXEMPLARY EMBODIMENTS

Hereinafter, the present invention will be described in detail by explaining exemplary embodiments of the invention with reference to the attached drawings.

Figure 1A:
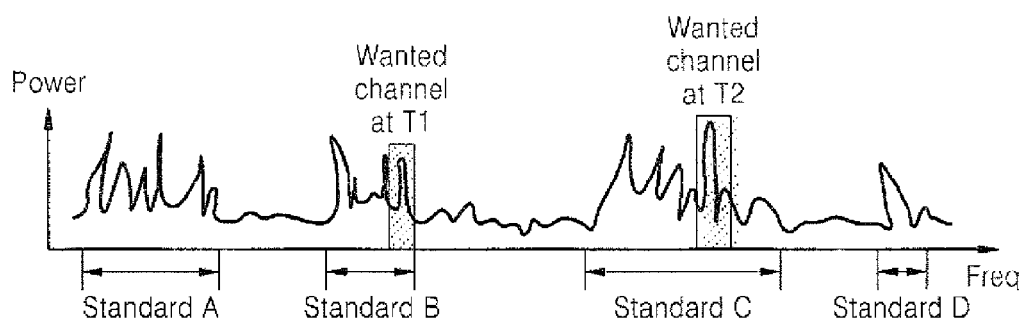
FIGS. 1A and 1B are diagrams for describing cognitive radio.
Figure 1B:
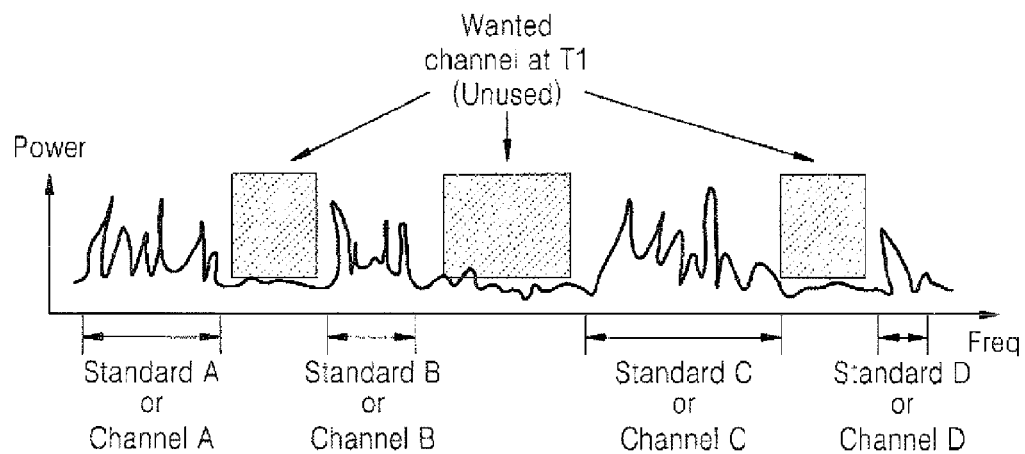
Figure 2A:
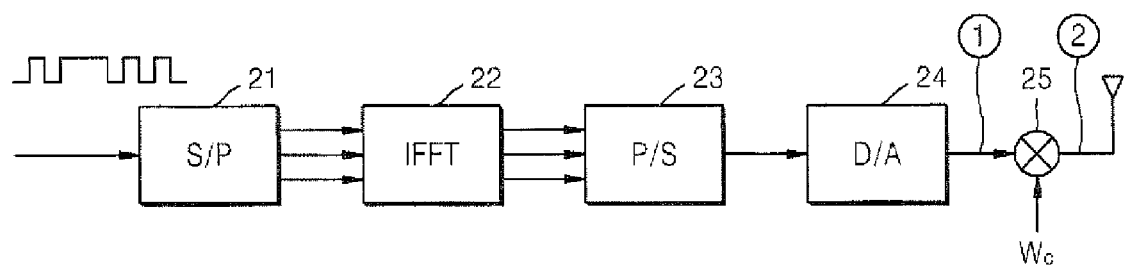
FIGS. 2A through 2C are diagrams for describing orthogonal frequency division multiplexing (OFDM) communication.
Figure 2B:
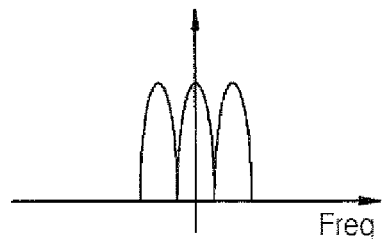
Figure 2C:
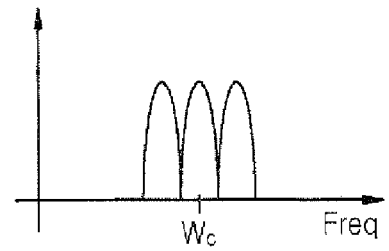
Figure 3A:
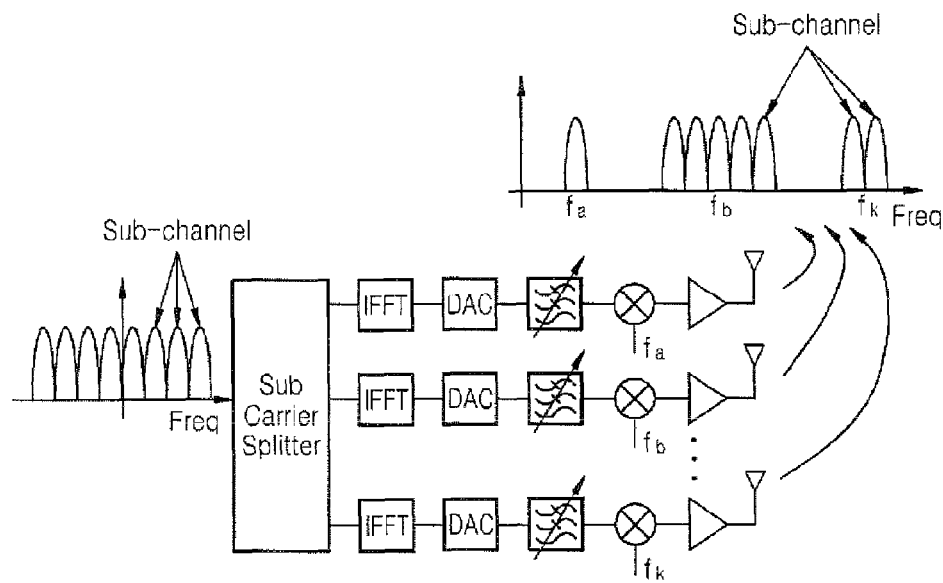
FIGS. 3A and 3B illustrate an OFDM communication system according to an exemplary embodiment of the present invention.
Figure 3B:
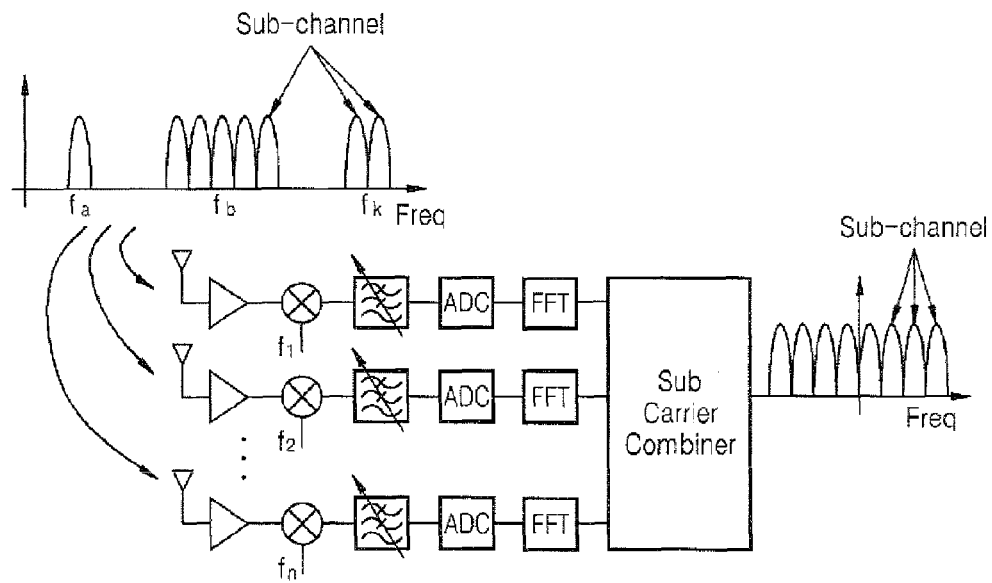

FIGS. 3A and 3B illustrate an OFDM communication system according to an exemplary embodiment of the present invention.

FIG. 3A is a block diagram illustrating a configuration of a digital signal transmitting apparatus according to an exemplary embodiment of the present invention. Referring to FIG. 3A, a subcarrier splitter splits a digital signal into a plurality of subcarrier groups. A bandwidth of each of the subcarrier groups is determined by controlling the number of subcarriers according to available frequency resources, i.e., bandwidths.

An inverse fast Fourier transformation (IFFT) is performed with respect to the signals split by the subcarrier splitter and then the signals are converted into analog signals by digital-to-analog converters (DACs). The analog signals are low-pass-filtered and then are respectively modulated to RF signals by using different carrier frequencies, according to currently available frequency bands. The currently available frequency bands may be searched for by cognitive radio technology.

FIG. 3B is a block diagram illustrating a configuration of a digital signal receiving apparatus according to an exemplary embodiment of the present invention. Operation of the digital signal receiving apparatus is the inverse of the operation of the digital signal transmitting apparatus of FIG. 3A.

That is, when subcarrier groups transmitted through wireless channels are received, the subcarrier groups are respectively demodulated into signals adjacent to each other at baseband using carriers which have different frequencies and then are low-pass-filtered. The filtered signals are converted into digital signals by analog-to-digital converters (ADCs).

An FFT is performed with respect to the digital signals. The signals on which FFT is performed are combined by a subcarrier combiner and then are restored to the original signals.

Figure 4:
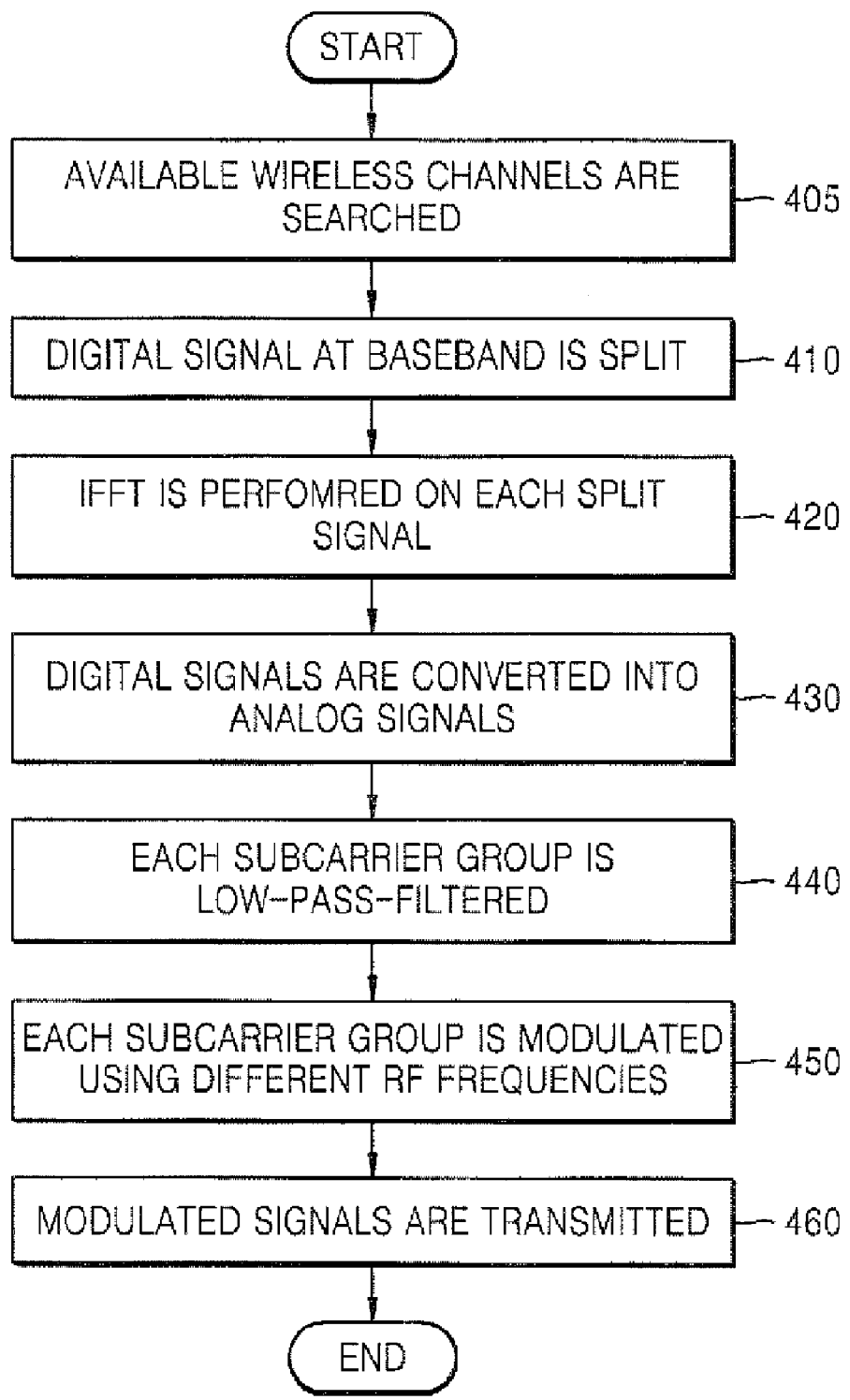
FIG. 4 is a flow chart of a method of transmitting digital signals according to an exemplary embodiment of the present invention.

FIG. 4 is a flow chart of a method of transmitting digital signals according to an exemplary embodiment of the present invention.

In operation 405, bandwidths of available wireless channels are searched for using cognitive radio technology.

In operation 410, a digital signal at baseband is split into a plurality of signals. Each of the split signals forms an independent subcarrier group. Bandwidths of subcarrier groups are determined by the bandwidths of the wireless channels searched for in operation 405. In other words, the reason why the digital signal at baseband is split in operation 410 is because the bandwidths of the subcarrier groups have to be controlled appropriately in order to fit the bandwidths of the searched for wireless channels.

In operation 420, an IFFT is performed on each of the split signals.

In operation 430, the signals on which the IFFT is performed are converted into analog signals.

In operation 440, the subcarrier groups are respectively low-pass-filtered. That is, one low-pass filter is used with respect to one subcarrier group. Since the bandwidths of the subcarrier groups can change constantly over time, the low-pass filters used in operation 440 have to be able to modify filtering sections according to the bandwidths of the input subcarrier groups.

In operation 450, the subcarrier groups are respectively frequency up-converted using RF signals which have different frequencies from each other. Here, the frequencies of the RF signals are determined by the frequencies of the wireless channels searched for in operation 405. The RF signals may be generated from one signal source in order to maintain orthogonality between the subcarriers. A plurality of phase-locked loops (PLLs) can be generated using a crystal oscillator, however, PLL hardware cannot be implemented easily and frequency errors can be generated due to the nonlinear PLLs. Preferably, but not necessarily, the required RF signals may be generated by a signal output from one PLL using a frequency divider or a frequency multiplier.

In operation 460, the frequency up-converted RF signals are transmitted.

Figure 5:
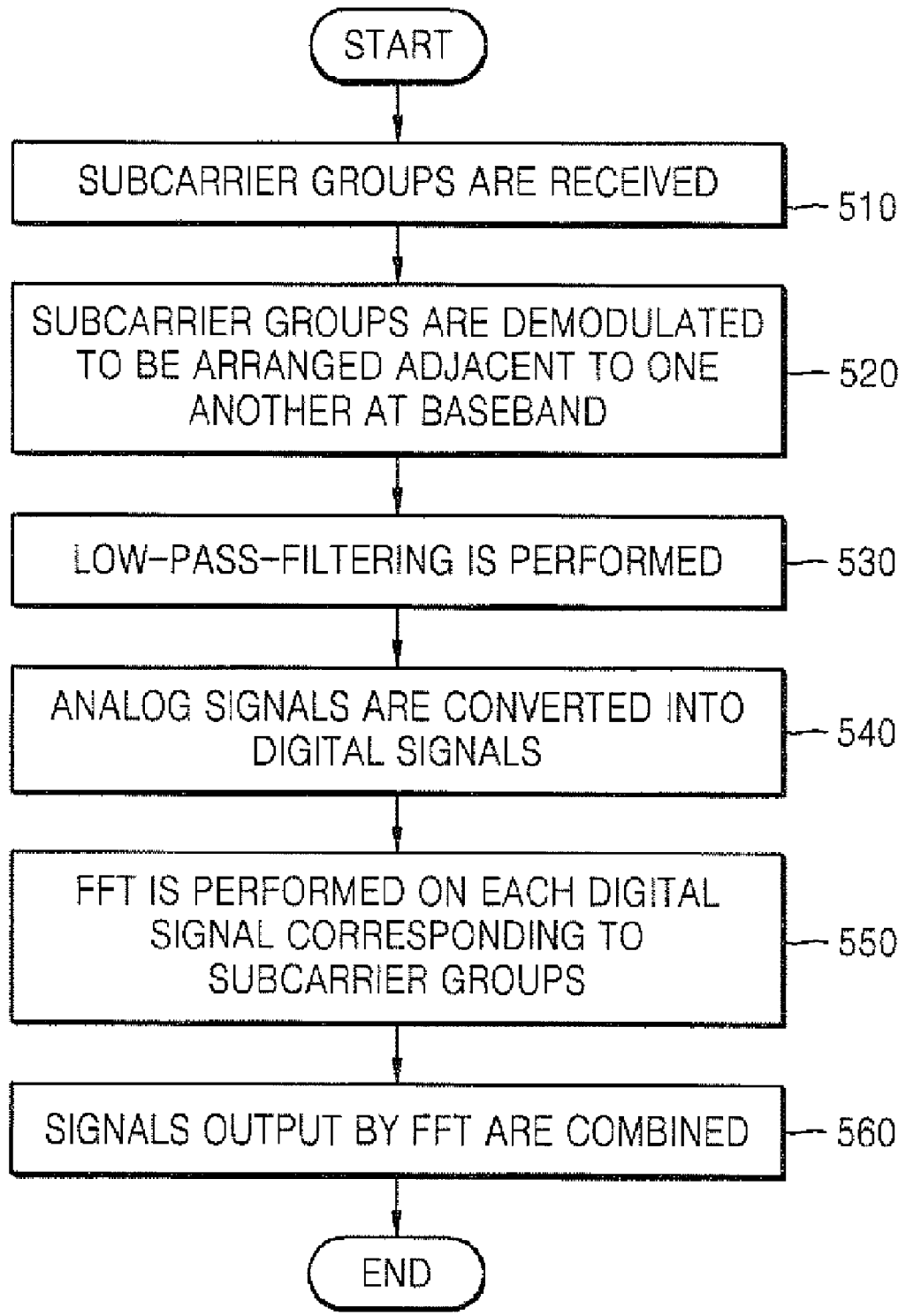
FIG. 5 is a flow chart of a method of receiving digital signals according to an exemplary embodiment of the present invention.

FIG. 5 is a flow chart of a method of receiving digital signals according to an exemplary embodiment of the present invention.

In operation 510, signals corresponding to subcarrier groups are received.

In operation 520, the subcarrier groups are respectively frequency down-converted so that all subcarriers of the subcarrier groups are arranged adjacent to each other at baseband. Here, different RF signals are used with respect to each of the subcarrier groups. Preferably, but not necessarily, the required RF signals may be generated by a signal output from one PLL using a frequency divider or a frequency multiplier as in the previous exemplary embodiment of the present invention.

In operation 530, the frequency down-converted signals are respectively low-pass-filtered. Accordingly, the same number of low-pass filters is used as the number of subcarrier groups. Since bandwidths of the subcarrier groups can change constantly over time, the low-pass filters have to be able to modify filtering sections according to the bandwidths of the input subcarrier groups.

In operation 540, the low-pass-filtered signals are converted into digital signals.

In operation 550, an FFT is performed on each of the digital signals corresponding to the subcarrier groups.

In operation 560, the signals on which the FFT is performed are combined together and then are restored to the original signal.

Figure 6:
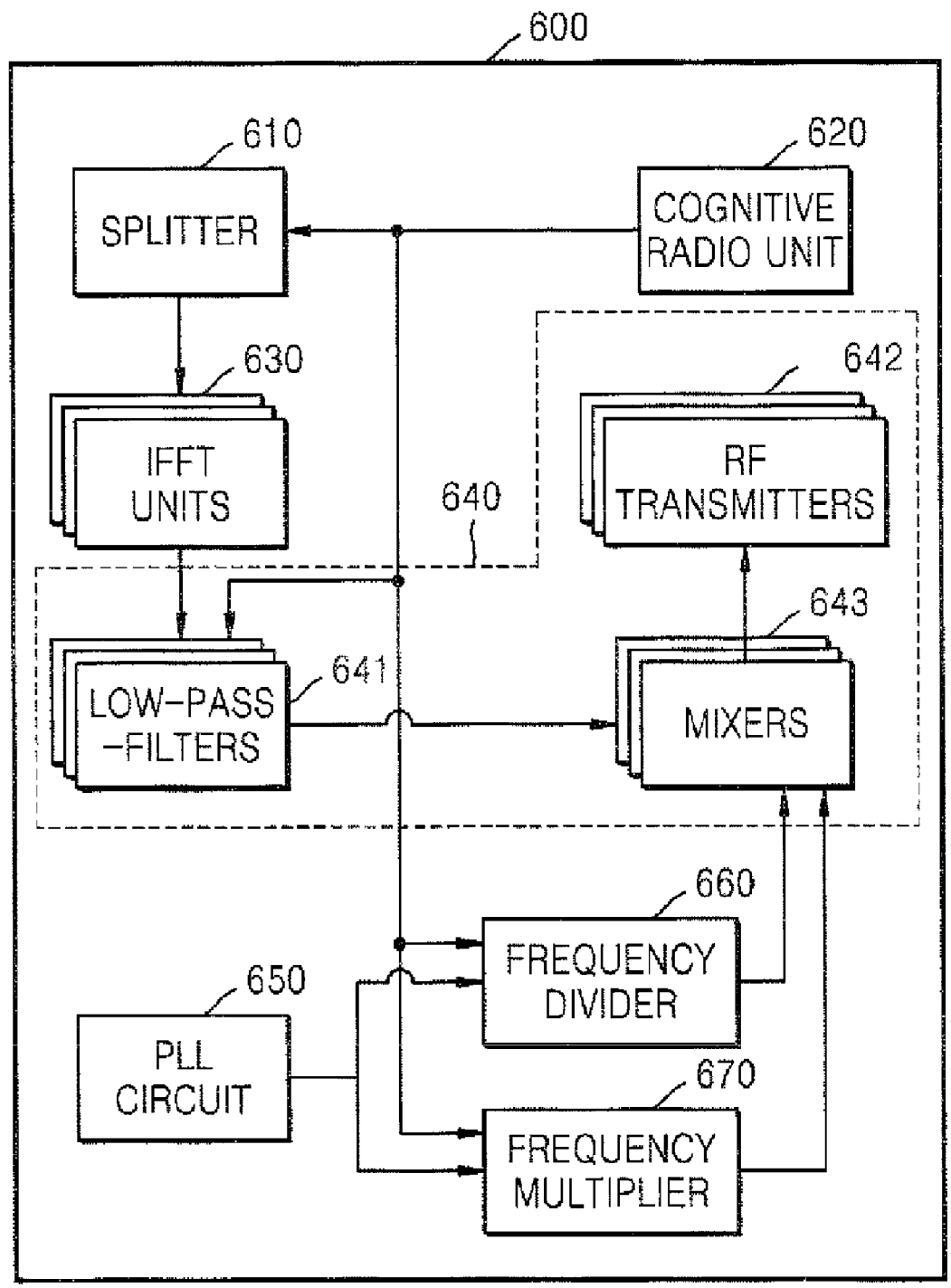
FIG. 6 is a block diagram illustrating a configuration of a digital signal transmitting apparatus according to an exemplary embodiment of the present invention.

FIG. 6 is a block diagram illustrating a configuration of a digital signal transmitting apparatus 600 according to an exemplary embodiment of the present invention.

Referring to FIG. 6, the digital signal transmitting apparatus 600 includes a splitter 610, a cognitive radio unit 620, IFFT units 630, a transmitter 640, a PLL circuit 650, a frequency divider 660, and a frequency multiplier 670.

The cognitive radio unit 620 searches for available wireless channels using cognitive radio technology.

The splitter 610 splits a digital signal at baseband into a plurality of signals with reference to the result of the search by the cognitive radio unit 620. Each of the split signals forms a subcarrier group. The transmitter 640 distributes a plurality of subcarrier groups among the available wireless channels and transmits the subcarrier groups. The transmitter 640 includes low-pass filters 641, mixers 643 and RF transmitters 642.

The low-pass filters 641 low-pass-filter signals output from the IFFT units 630. The signals output from the IFFT units 630 are digital signals, and the signals are converted into analog signals and then are processed. However, a description of digital-to-analog conversion will be omitted for the sake of brevity. Hereinafter, a description of digital-to-analog conversion or analog-to-digital conversion will also be omitted. Since bandwidths of the subcarrier groups can change constantly over time, the low-pass filters 641 may modify filtering sections according to the bandwidths of the input subcarrier groups.

The mixers 643 modulate the low-pass-filtered signals to RF signals, respectively. The RF transmitters 642 transmit the RF signals externally. The mixers 643 frequency up-convert each of the subcarrier groups in order to transmit them through the available wireless channels. Accordingly, the RF signals have different frequencies from each other. The RF signals are generated by a signal output from one PLL circuit 650 using the frequency divider 660 and/or the frequency multiplier 670. In FIG. 6, both the frequency divider 660 and the frequency multiplier 670 are illustrated. However, only one of the frequency divider 660 and the frequency multiplier 670 can be used depending on circumstances.

Figure 7:
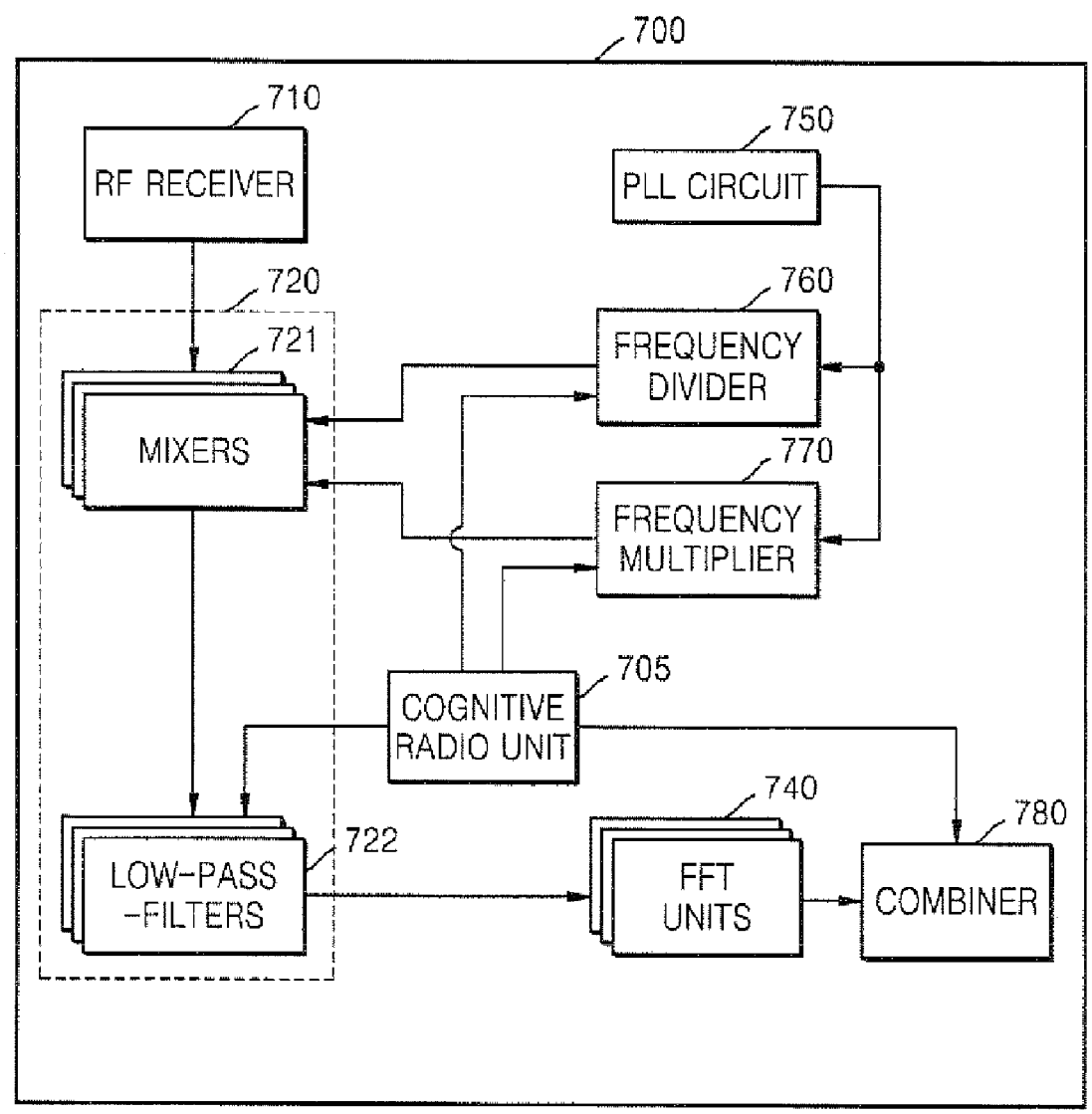
FIG. 7 is a block diagram illustrating a configuration of a digital signal receiving apparatus according to an exemplary embodiment of the present invention.

FIG. 7 is a block diagram illustrating a configuration of a digital signal receiving apparatus 700 according to an exemplary embodiment of the present invention.

Referring to FIG. 7, the digital signal receiving apparatus 700 includes a cognitive radio unit 705, an RF receiver 710, a demodulator 720, FFT units 740, a PLL circuit 750, a frequency divider 760, a frequency multiplier 770, and a combiner 780.

The cognitive radio unit 705 searches for frequency bandwidths in which data to be received is transmitted. The RF receiver 710 receives subcarrier groups through wireless channels and the demodulator 720 demodulates the received subcarrier groups, respectively, so that the subcarrier groups are arranged adjacent to each other at baseband. The demodulate 720 includes mixers 721 and low-pass filters 722. The mixers 721 frequency down-convert the signals received by the RF receiver 710, respectively, and the low-pass filters 722 low-pass-filter the frequency down-converted signals, respectively. Since bandwidths of the subcarrier groups can change constantly over time, the low-pass filters 722 may modify filtering sections according to the bandwidths of the input subcarrier groups.

The RF signals used for frequency down-conversion of the subcarrier groups have different frequencies from each other. The RF signals are generated by a signal output from one PLL circuit 750 using the frequency divider 760 and/or the frequency multiplier 770.

The FFT units 740 perform a FFT with respect to each of the signals output from the low-pass filters 722, i.e., the subcarrier groups.

The combiner 780 combines the signals output from the FFT units 740 and then outputs signals corresponding to the subcarrier groups arranged adjacent to each other at baseband.

FIG. 8 is a diagram of a method of transmitting and receiving digital signals according to an exemplary embodiment of the present invention.

Although not shown in FIG. 8, a digital signal at baseband is separated into 10 signals, i.e., 10 subcarriers, by a serial-to-parallel converter. Then, the subcarriers are split into 3 subcarrier groups by a splitter. For convenience of description, the subcarriers are denoted as first through tenth subcarriers in numerical order. A first subcarrier group includes the first through third subcarriers, a second subcarrier group includes the fourth through seventh subcarriers, and a third subcarrier group includes the eighth through tenth subcarriers. Since three subcarrier groups are generated according to the current exemplary embodiment, three IFFT units and three mixers will be used in a transmitting portion, and three mixers and three FFT units will be used in a receiving portion. In the current exemplary embodiment, 4-point IFFT is assumed.

The three subcarrier groups are frequency up-converted by carriers which have frequencies of $f_a$, $f_b$ and $f_c$, respectively, and then are transmitted. Here, $f_a$, $f_b$ and $f_c$ are searched for by cognitive radio technology in order to transmit the subcarrier groups through available frequency bands.

In the receiving portion, the three subcarrier groups are received and then are respectively frequency down-converted. Here, RF signals of $f_1$, $f_2$ and $f_3$ are used with respect to the subcarrier groups. $f_1$, $f_2$ and $f_3$ are set so as to arrange the subcarriers of the three subcarrier groups after frequency down-conversion adjacent to each other at baseband in the same order as the subcarriers are arranged before the frequency down-conversion. For example, in order to arrange the subcarriers in the first subcarrier group having the frequency $f_1$ in the same order as the original signal, the subcarriers have to be frequency down-converted for $3\Delta f$ more than $f_a$ ($f_1=f_a+3\Delta f$). Here, $\Delta f$ is sub-channel spacing, that is, a bandwidth of one subcarrier.

Likewise, $f_2$ is the same as $f_b$ ($f_2=f_b$), and $f_3$ is calculated by subtracting $4\Delta f$ from $f_c$ ($f_3=f_c-4\Delta f$). As described above, the frequency down-converted signals are converted into frequency domain signals in the FFT units and then are combined by a combiner so as to be restored to the original signal.

Exemplary embodiments of the present invention can be written as computer programs and can be implemented in general-use digital computers that execute the programs using non-transitory a computer readable recording medium. Examples of the computer readable recording medium include magnetic storage media (e.g., ROM, floppy disks, hard disks, etc.), optical recording media (e.g., CD-ROMs, or DVDs), and other storage media.

According to an exemplary embodiment of the present invention, data may be transmitted and received by splitting the data among desired bandwidths using orthogonality between subcarriers in an OFDM system. Therefore, wireless resources may be used efficiently by combining with cognitive radio technology.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for a wireless communication system to transmit a digital signal, the method comprising:
   determining a number of subcarriers, to be assigned to each of a plurality of subcarrier groups, based on a bandwidth of each of available frequency bands, wherein each of the subcarrier groups comprises at least one subcarrier, and at least two subcarrier groups among the plurality of subcarrier groups have different numbers of subcarriers and different frequency bandwidths;
   splitting the digital signal at baseband into a plurality of signals, according to the determining;
   performing inverse fast Fourier transformation (IFFT) on each of the plurality of signals to generate the plurality of subcarrier groups; and
   transmitting each of the subcarrier groups through each of the available frequency bands, respectively,
   wherein the transmitting comprises:
      low-pass-filtering each of the subcarrier groups;
      modulating each of the low-pass-filtered subcarrier groups independently using different radio frequency (RF) signals; and
      transmitting the modulated subcarrier groups, and
   wherein the different RF signals have different frequencies from one another, and are generated by at least one of a frequency divider and a frequency multiplier using a signal output from a phase-locked loop (PLL) circuit.

2. The method of claim 1, the method further comprising searching for the available frequency bands using cognitive radio technology.

3. The method of claim 1, wherein the modulating each of the low-pass-filtered subcarrier groups comprises frequency up-converting each of the low-pass-filtered subcarrier groups using the different RF signals.

4. The method of claim 1, wherein the low-pass-filtering is performed according to a bandwidth of each of the subcarrier groups.

5. The method of claim 1, wherein at least two of the plurality of subcarrier groups are transmitted through two non-adjacent frequency bands of the available frequency bands.

6. A non-transitory computer readable tangible storage medium having recorded thereon a computer program for executing a method of transmitting a digital signal, the method comprising:
   determining a number of subcarriers, to be assigned to each of a plurality of subcarrier groups, based on a bandwidth of each of available frequency bands, wherein each of the subcarrier groups comprises at least one subcarrier, and at least two subcarrier groups among the plurality of subcarrier groups have different numbers of subcarriers and different frequency bandwidths;
   splitting the digital signal at baseband into a plurality of signals, according to the determining;
   performing inverse fast Fourier transformation (IFFT) on each of the plurality of signals to generate the plurality of subcarrier groups; and
   transmitting each of the subcarrier groups through each of the available frequency bands, respectively,
   wherein the transmitting comprises:
      low-bass-filtering each of the subcarrier groups;
      modulating each of the low-pass-filtered subcarrier groups independently using different radio frequency (RF) signals; and
      transmitting the modulated subcarrier groups, and
   wherein the different RF signals have different frequencies from one another, and are generated by at least one of a frequency divider and a frequency multiplier using a signal output from a phase-locked loop (PLL) circuit.

7. The non-transitory computer readable tangible storage medium of claim 6, wherein at least two of the plurality of subcarrier groups are transmitted through two non-adjacent frequency bands of the available frequency bands.

8. An apparatus for transmitting a digital signal, the apparatus comprising:
   a splitter which determines a number of subcarriers, to be assigned to each of a plurality of subcarrier groups, based on a bandwidth of each of available frequency bands, and, according to the determination, splits the digital signal at baseband into a plurality of signals, wherein each of the subcarrier groups comprises at least one subcarrier, and at least two subcarrier groups among the plurality of subcarrier groups have different numbers of subcarriers and different frequency bandwidths;
   a plurality of inverse fast Fourier transformation (IFFT) units which performs IFFT on each of the plurality of signals to generate the plurality of subcarrier groups; and
   a transmitter which transmits each of the subcarrier groups through each of the available frequency bands, respectively,
   wherein the transmitter comprises:
      a plurality of low-pass filters which low-pass-filters each of the subcarrier groups;
      a plurality of mixers which modulates each of the low-pass-filtered subcarrier groups independently using different radio frequency (RF) signals; and
      a plurality of RF transmitters which transmits the modulated subcarrier groups, and
   wherein the apparatus for transmitting the digital signal further comprises:
      a phase-locked loop (PLL) circuit which generates an RF signal; and
      at least one of a frequency divider and a frequency multiplier which generates the different RF signals which have different frequencies from one another using the RF signal output from the PLL circuit, and
   wherein the mixers modulate the subcarrier groups using the different RF signals which have different frequencies from one another.

9. The apparatus for transmitting a digital signal of claim 8, the apparatus further comprising a cognitive unit which searches for the available frequency bands using cognitive radio technology.

10. The apparatus for transmitting a digital signal of claim 8, wherein the mixers are configured to frequency up-convert each of the low-pass-filtered subcarrier groups using the different RF signals.

11. The apparatus for transmitting a digital signal of claim 8, wherein the low-pass filters low-pass-filter each of the subcarrier groups according to a bandwidth of each of the subcarrier groups.

12. The apparatus of claim 8, wherein the transmitter transmits at least two of the plurality of subcarrier groups through two non-adjacent frequency bands of the available frequency bands.

13. A method for a wireless communication system to receive a digital signal, the method comprising:
receiving a plurality of subcarrier groups modulated using radio frequency (RF) signals which have different frequencies from one another;
demodulating each of the subcarrier groups so that all subcarriers of the subcarrier groups are arranged adjacent to each other at baseband, wherein each of the subcarrier groups has been transmitted through each of a plurality of frequency bands, respectively, and at least two frequency bands have different bandwidths;
performing fast Fourier transformation (FFT) on each of the demodulated subcarrier groups independently; and
combining the subcarrier groups on which the FFT is performed,
wherein the demodulating comprises:
frequency down-converting each of the subcarrier groups independently using the RF signals which have different frequencies from one another; and
low-pass-filtering each of the frequency down-converted subcarrier groups according to a bandwidth of each of the subcarrier groups, and
wherein the RF signals which have different frequencies from one another are generated by at least one of a frequency divider and a frequency multiplier using a signal output from a phase-locked loop (PLL) circuit.

14. The method of claim 13, wherein a number of subcarriers to be assigned to each of the subcarrier groups is determined based on a bandwidth of each of the plurality of frequency bands.

15. The method of claim 14, wherein at least two of the plurality of subcarrier groups have been transmitted through two non-adjacent frequency bands of the available frequency bands.

16. A non-transitory computer readable tangible storage medium having recorded thereon a computer program for executing a method of receiving a digital signal, the method comprising:
receiving a plurality of subcarrier groups modulated using radio frequency (RF) signals which have different frequencies from one another;
demodulating each of the subcarrier groups so that all subcarriers of each of the subcarrier groups are arranged adjacent to each other at baseband, wherein each of the subcarrier groups has been transmitted through each of a plurality of frequency bands, respectively, and at least two frequency bands have different bandwidths;
performing fast Fourier transformation (FFT) on each of the demodulated subcarrier groups independently; and
combining the subcarrier groups on which the FFT is performed,
wherein the demodulating comprises:
frequency down-converting each of the subcarrier groups independently using the RF signals which have different frequencies from one another; and
low-pass-filtering each of the frequency down-converted subcarrier groups according to a bandwidth of each of the subcarrier groups, and
wherein the RF signals which have different frequencies from one another are generated by at least one of a frequency divider and a frequency multiplier using a signal output from a phase-locked loop (PLL) circuit.

17. The non-transitory computer readable tangible storage medium of claim 16, wherein a number of subcarriers to be assigned to each of the subcarrier groups is determined based on a bandwidth of each of the plurality of frequency bands.

18. The non-transitory computer readable tangible storage medium of claim 17, wherein at least two of the plurality of subcarrier groups have been transmitted through two non-adjacent frequency bands of the available frequency bands.

19. An apparatus for receiving a digital signal, the apparatus comprising:
a radio frequency (RF) receiver which receives a plurality of subcarrier groups modulated using RF signals which have different frequencies from each other;
a demodulator which demodulates each of the subcarrier groups so that all subcarriers of each of the subcarrier groups are arranged adjacent to one another at baseband, wherein each of the subcarrier groups has been transmitted through each of a plurality of frequency bands, respectively, and at least two frequency bands have different bandwidths;
a plurality of fast Fourier transformation (FFT) units which performs FFT on each of the demodulated subcarrier groups independently; and
a combiner which combines the subcarrier groups on which the FFT is performed,
wherein the demodulator comprises:
a plurality of mixers which frequency down-converts each of the subcarrier groups independently using the RF signals which have different frequencies from one another; and
a plurality of low-pass filters which low-pass-filters each of the frequency down-converted subcarrier groups according to a bandwidth of each of the subcarrier groups, and
wherein the apparatus for transmitting the digital signal further comprises:
a phase-locked loop (PLL) circuit which generates an RF signal; and
at least one of a frequency divider and a frequency multiplier which generates the RF signals which have different frequencies from each other using the RF signal output from the PLL circuit,
wherein the mixers modulates the subcarrier groups using the RF signals which have different frequencies from one another.

20. The apparatus of claim 19, wherein a number of subcarriers to be assigned to each of the subcarrier groups is determined based on a bandwidth of each of the plurality of frequency bands.

21. The apparatus of claim 20, wherein at least two of the plurality of subcarrier groups have been transmitted through two non-adjacent frequency bands of the available frequency bands.

* * * * *